(12) United States Patent
Akashika et al.

(10) Patent No.: US 7,612,873 B2
(45) Date of Patent: Nov. 3, 2009

(54) SURFACE FORM MEASURING APPARATUS AND STRESS MEASURING APPARATUS AND SURFACE FORM MEASURING METHOD AND STRESS MEASURING METHOD

(75) Inventors: Kumiko Akashika, Kyoto (JP); Masahiro Horie, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 176 days.

(21) Appl. No.: 11/979,116

(22) Filed: Oct. 31, 2007

(65) Prior Publication Data

US 2008/0111987 A1     May 15, 2008

(30) Foreign Application Priority Data

Nov. 13, 2006    (JP)   ............... P2006-306471
Sep. 13, 2007    (JP)   ............... P2007-237381

(51) Int. Cl.
    *G01B 11/16*     (2006.01)
(52) U.S. Cl. ........................................ 356/32
(58) Field of Classification Search ............ 356/32–36
See application file for complete search history.

(56) References Cited

U.S. PATENT DOCUMENTS

2004/0075836 A1    4/2004    Horie et al.

2008/0075328 A1*    3/2008    Sciammarella ............ 382/108

FOREIGN PATENT DOCUMENTS

JP      2000-9553      1/2000
JP      2004-138519     5/2004

* cited by examiner

*Primary Examiner*—Michael P Stafira
(74) *Attorney, Agent, or Firm*—McDermott Will & Emery LLP (57) ABSTRACT

In a stress measuring apparatus, reflected light of light emitted to a substrate through an objective lens is received by a light shielding pattern imaging part, to acquire an image of a light shielding pattern positioned at an aperture stop part of an optical system. A control part obtains gradient vectors of the substrate in a plurality of gradient vector measurement areas and surface form of the substrate on the basis of outputs of the light shielding pattern imaging part, to obtain a stress in a film formed on the substrate. Since light directed through the objective lens becomes approximately parallel rays of light on the substrate, measurement can be performed without focusing on each gradient vector measurement area and the surface form of the substrate can be obtained easily and rapidly. Consequently, it is possible to obtain a stress in the film formed on the substrate easily and rapidly.

20 Claims, 6 Drawing Sheets

SURFACE FORM MEASURING APPARATUS AND STRESS MEASURING APPARATUS AND SURFACE FORM MEASURING METHOD AND STRESS MEASURING METHOD

BACKGROUND OF THE INVENTION

1. Field of the Invention

The present invention relates to a technique for measuring surface form of an object and also relates to a technique for measuring a stress in a film formed on an object with use of measured surface form.

2. Description of the Background Art

In manufacturing a semiconductor device, conventionally, various processings such as a film deposition or an annealing process on a semiconductor substrate (hereinafter, simply referred to as "substrate") are performed, and a residual stress occurs in a thin film on the substrate due to these processes. In recent, with high definition of the semiconductor device, the residual stress greatly affects the quality of the semiconductor device to increase the necessity of measurement of the stress in the thin film.

As one apparatus for measuring a stress in a thin film in a noncontact manner, Japanese Patent Application Laid-Open No. 2000-9553 (Document 1) discloses a thin film evaluation apparatus for measuring a radius of curvature of a substrate by an optical lever detection method to obtain a stress in a thin film with use of the measured radius of curvature. In the thin film evaluation apparatus of Document 1, a laser beam emitted from a laser light source moves on the substrate, reflected lights reflected on the thin film are received on a detector and reflection angles in a plurality of positions on the thin film are calculated on the basis of receiving positions on the detector, to thereby obtain the radius of curvature.

Japanese Patent Application Laid-Open No. 2004-138519 (Document 2) discloses a film thickness measuring apparatus for measuring a thickness of a film formed on an object, where a light shielding pattern is positioned on an optical path of an illumination light which is emitted from a light source to the object, an image of the light shielding pattern is formed on the optical path of a reflected light reflected on the object, and a tilt angle of the object is obtained on the basis of the image. In the film thickness measuring apparatus of Document 2, a thickness of the film formed on the object is obtained with use of the obtained tilt angle, thereby achieving a high accurate film thickness measurement.

In the thin film evaluation apparatus of Document 1, since the laser beam is used for measurement of the radius of curvature, when a reflectance of a measurement object to a wavelength of the laser beam is low, measurement errors of the radius of curvature become large and it is not possible to obtain the stress in the film with high accuracy. In a case where a pattern is formed on a substrate, since the laser beam is scattered because of the pattern and the radius of curvature cannot be obtained with high accuracy, the apparatus of Document 1 is less suitable for stress measurement of the substrate on which a pattern is formed.

Further, in the apparatus of Document 1, since the radius of curvature is obtained on the basis of the shifts of the receiving positions on the detector of the reflected lights reflected on the plurality of measurement positions and a focusing position in each measurement position greatly affects a measurement result, a high accurate focusing has to be performed in each measurement position. As a result, the construction of the apparatus is complicated to increase a time period for stress measurement.

SUMMARY OF THE INVENTION

The present invention is intended for a surface form measuring apparatus for measuring surface form of an object and it is an object of the present invention to obtain surface form of the object easily and rapidly. The present invention is also intended for a stress measuring apparatus for measuring a stress in a film formed on an object, and it is another object of the present invention to obtain a stress in the film formed on the object on the basis of surface form of the object easily and rapidly.

The surface form measuring apparatus of the present invention comprises: a light source for emitting a light; an optical system for directing the light emitted from the light source to an irradiation region on an object through an objective lens and directing a reflected light reflected on the irradiation region to a predetermined position through the objective lens; a light shielding pattern positioned at a position almost optically conjugate to an aperture stop position on an optical path from the light source to the irradiation region; an imaging part for acquiring an image of the light shielding pattern formed on the predetermined position; a gradient vector calculation part for obtaining a gradient vector indicating a normal direction of the irradiation region on the basis of an output of the imaging part; a moving mechanism for moving the irradiation region relatively to the object; and a surface form calculation part for obtaining surface form of the object on the basis of gradient vectors in a plurality of areas on the object, the gradient vectors being obtained by the gradient vector calculation part. In the surface form measuring apparatus, it is possible to obtain surface form of the object easily and rapidly.

The stress measuring apparatus of the present invention comprises: a light source for emitting a light; an optical system for directing the light emitted from the light source to an irradiation region on an object through an objective lens and directing a reflected light reflected on the irradiation region to a predetermined position through the objective lens; a light shielding pattern positioned at a position almost optically conjugate to an aperture stop position on an optical path from the light source to the irradiation region; an imaging part for acquiring an image of the light shielding pattern formed on the predetermined position; a gradient vector calculation part for obtaining a gradient vector indicating a normal direction of the irradiation region on the basis of an output of the imaging part; a moving mechanism for moving the irradiation region relatively to the object; a surface form calculation part for obtaining surface form of the object on the basis of gradient vectors in a plurality of areas on the object, the gradient vectors being obtained by the gradient vector calculation part; a curvature radius calculation part for obtaining a radius of curvature of a stress measurement area on the object on the basis of the surface form obtained by the surface form calculation part; a film thickness measuring part for optically measuring a thickness of a film formed on the object; and a stress calculation part for obtaining a stress in the film of the stress measurement area on the basis of the radius of curvature and the thickness of the film in the stress measurement area which are obtained by the curvature radius calculation part and the film thickness measuring part. In the stress measuring apparatus, it is possible to obtain a stress in the film formed on the object easily and rapidly.

According to a preferred embodiment of the present invention, the film thickness measuring part comprises: a light receiving part for receiving the reflected light reflected on the irradiation region; and a film thickness calculation part for obtaining a thickness of the film in the irradiation region by spectroscopic reflectometry on the basis of an output of the light receiving part.

According to another preferred embodiment of the present invention, the film thickness measuring part comprises: a light source unit which has another light source and emits a polarized light to the object; a light receiving unit which receives a reflected light of the polarized light reflected on the object to acquire a polarization state of the reflected light; and a film thickness calculation part for obtaining a thickness of the film formed on the object on the basis of the polarization state acquired by the light receiving unit.

According to still another preferred embodiment of the present invention, the stress measuring apparatus further comprises: a holding part for holding the object; a distance detection part for detecting a distance between the objective lens and the holding part where an object is not held and a distance between the objective lens and the object held by the holding part with use of a light directed through the objective lens; and an object thickness calculation part for obtaining a thickness of the object on the basis of the distance between the objective lens and the object and the distance between the objective lens and the holding part, the thickness of the object being used in calculation of a stress in the film by the stress calculation part.

According to an aspect of the present invention, a surface form measuring method of measuring surface form of an object comprises the steps of: a) applying a light emitted from a light source to an irradiation region on an object through an optical system having an objective lens; b) directing a reflected light of the light reflected on the irradiation region to a predetermined position through the objective lens, to form an image of a light shielding pattern on the predetermined position and acquire the image by an imaging part, the light shielding pattern being positioned at a position almost optically conjugate to an aperture stop position on an optical path from the light source to the irradiation region; c) repeating the steps a) and b) while moving the irradiation region relatively to the object to obtain gradient vectors indicating a normal direction of a plurality of areas on the object on the basis of outputs of the imaging part; and d) obtaining surface form of the object on the basis of the gradient vectors in the plurality of areas.

In the surface form measuring method, it is preferable that relative movement of the irradiation region to the object is continuously performed in the step c).

According to another aspect of the present invention, a stress measuring method of measuring a stress in a film formed on an object comprises the steps of: a) applying a light emitted from a light source to an irradiation region on an object through an optical system having an objective lens; b) directing a reflected light of the light reflected on the irradiation region to a predetermined position through the objective lens, to form an image of a light shielding pattern on the predetermined position and acquire the image by an imaging part, the light shielding pattern being positioned at a position almost optically conjugate to an aperture stop position on an optical path from the light source to the irradiation region; c) repeating the steps a) and b) while moving the irradiation region relatively to the object to obtain gradient vectors indicating a normal direction of a plurality of areas on the object on the basis of outputs of the imaging part; d) obtaining surface form of the object on the basis of the gradient vectors in the plurality of areas; e) obtaining a radius of curvature of a stress measurement area on the object on the basis of the surface form; f) optically measuring a thickness of a film in the stress measurement area; and g) obtaining a stress in the film of the stress measurement area on the basis of the radius of curvature and the thickness of the film in the stress measurement area.

In the stress measuring method, it is preferable that relative movement of the irradiation region to the object is continuously performed in the step c).

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
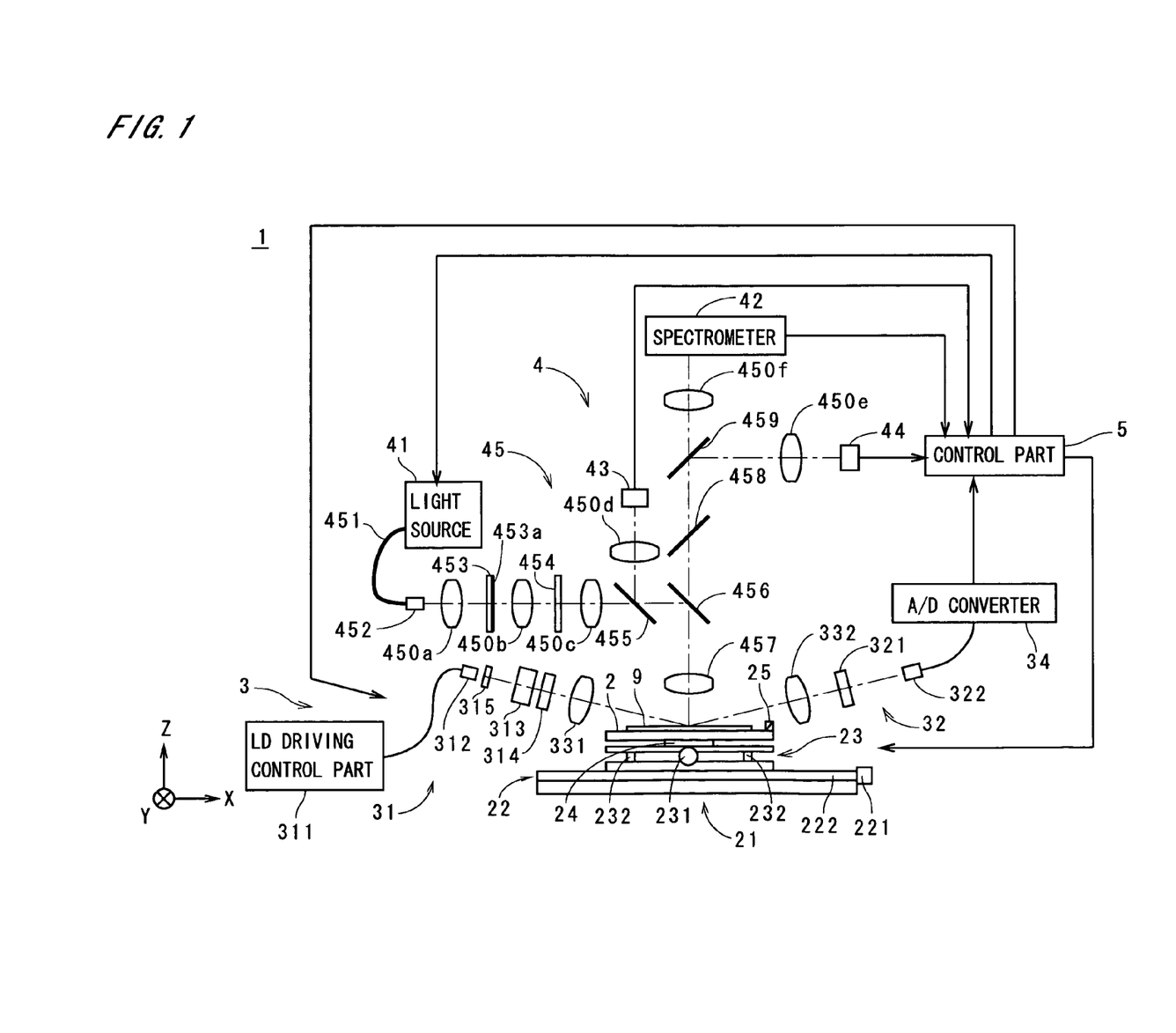
FIG. 1 is a view showing a constitution of a stress measuring apparatus in accordance with a first preferred embodiment.

FIG. 1 is a view showing a construction of a stress measuring apparatus 1 in accordance with the first preferred embodiment of the present invention. The stress measuring apparatus 1 is an apparatus for measuring a stress in a film which is formed on a main surface of a semiconductor substrate 9 (hereinafter, simply referred to as "substrate 9"). The film may be a single layer film or a multilayer film. A pattern such as a wiring pattern is not formed on the substrate 9 in the preferred embodiment.

As shown in FIG. 1, the stress measuring apparatus 1 has a stage 2 which is a substrate holding part for holding the substrate 9, a stage moving mechanism 21 for moving the stage 2 in the X direction and the Y direction of FIG. 1, a stage elevating mechanism 24 for moving the stage 2 up and down in the Z direction of FIG. 1, an ellipsometer 3 for acquiring information used to perform ellipsometry on the film on the substrate 9, a spectroscopic unit 4 for acquiring spectral intensity of a reflected light reflected on the substrate 9, and a control part 5 for controlling these constituent elements.

Figure 2:
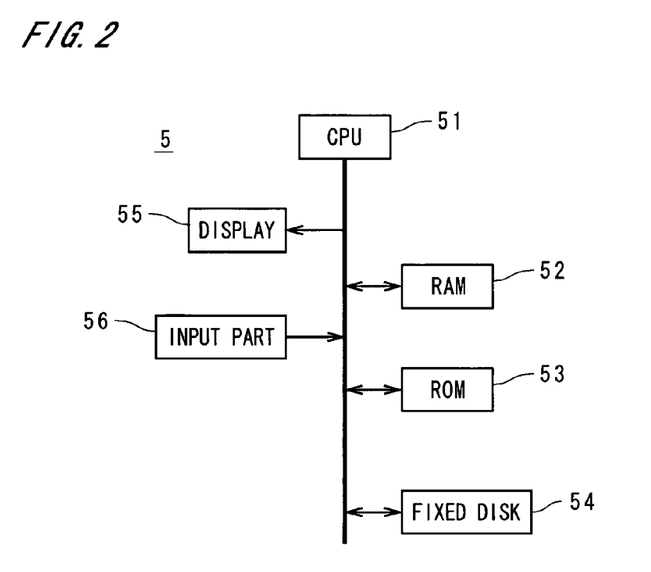
FIG. 2 is a view showing a constitution of a control part.

FIG. 2 is a view showing a constitution of the control part 5. As shown in FIG. 2, the control part 5 has a construction, like a general-type computer, in which a CPU 51 for performing various computations, a RAM 52 storing programs to be executed and serving as a work area for various computations, a ROM 53 for storing a basic program, a fixed disk 54 for storing various pieces of information, a display 55 for displaying various pieces of information to an operator, an input part 56 such as a keyboard and a mouse, and the like are all connected to one another.

Figure 3:
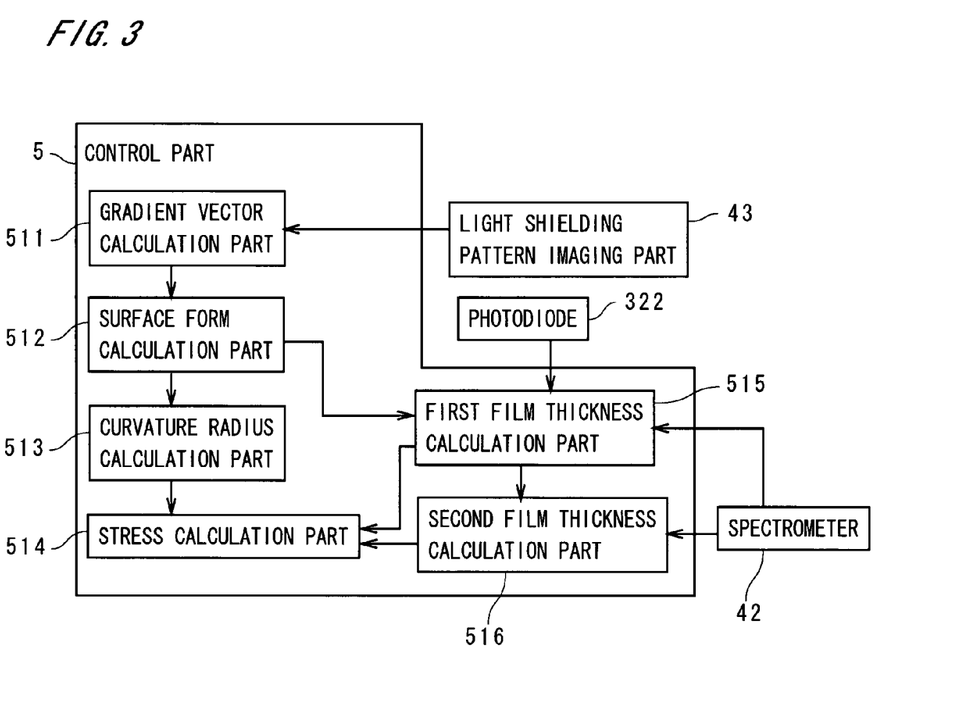
FIG. 3 is a block diagram showing functions of the control part.

FIG. 3 is a block diagram showing functions implemented through computations performed by the CPU 51 and the like in the control part 5 (see FIG. 2) in accordance with the program, together with other functional constitutions. A gradient vector calculation part 511, a surface form calculation part 512, a curvature radius calculation part 513, a stress calculation part 514, a first film thickness calculation part 515, and a second film thickness calculation part 516 in FIG. 3 correspond to functions implemented by the CPU 51 and the like. These functions may be implemented by a plurality of computers.

As shown in FIG. 1, the stage moving mechanism 21 has an X-direction moving mechanism 22 for moving the stage 2 in the X direction of FIG. 1 and a Y-direction moving mechanism 23 for moving the stage 2 in the Y direction. The X-direction moving mechanism 22 has a motor 221 and a ball screw (not shown) connected with the motor 221, and with rotation of the motor 221, the Y-direction moving mechanism 23 moves in the X direction of FIG. 1 along guide rails 222. The Y-direction moving mechanism 23 has the same constitution as the X-direction moving mechanism 22, and with rotation of a motor 231, the stage 2 is moved by a ball screw (not shown) in the Y direction along guide rails 232. In the stress measuring apparatus 1, an irradiation region of light emitted from the ellipsometer 3 to the substrate 9 and an irradiation region of light emitted from the spectroscopic unit 4 to the substrate 9 are moved relatively to the substrate 9 by the stage moving mechanism 21.

The ellipsometer 3 has a light source unit 31 for emitting a polarized light to the substrate 9 and a light receiving unit 32 for receiving a reflected light of the polarized light reflected on the substrate 9 to acquire a polarization state of the reflected light. Data indicating the polarization state is outputted to the control part 5.

The light source unit 31 has a laser diode (LD) 312 which is a light source for emitting a laser beam, an LD driving control part 311 for controlling an output of the laser diode 312, a polarizing filter 313, and a quarter-wave plate 314. In the ellipsometer 3, the laser beam emitted from the laser diode 312 of the light source unit 31 enters the polarizing filter 313, and the polarizing filter 313 extracts a linearly polarized light. The light from the polarizing filter 313 enters the quarter-wave plate 314 to be converted to a circularly polarized light by the quarter-wave plate 314 and the light from the quarter-wave plate 314 is directed to a surface of the substrate 9 on the stage 2 through a lens 331 at a predetermined incident angle (e.g., 72 to 80 degrees). An electro-magnetic shutter 315 for shutting out the laser beam is provided in the light source unit 31 (specifically, on an optical path between the laser diode 312 and the polarizing filter 313) to perform an ON/OFF control of emission of light to the substrate 9.

The light receiving unit 32 has a rotating analyzer 321 and a photodiode 322. In the ellipsometer 3, the reflected light of the light which is emitted from the light source unit 31 to the substrate 9 is directed to the rotating analyzer 321 through a lens 332 and goes through the rotating analyzer 321 which rotates about an axis parallel to an optical axis, to be received by the photodiode 322. A signal indicating the intensity of the received light by the photodiode 322 is outputted to the first film thickness calculation part 515 (see FIG. 3) of the control part 5 through an A/D converter 34, and the polarization state of the reflected light is acquired by associating the output of the photodiode 322 with a rotation angle of the rotating analyzer 321.

In the stress measuring apparatus 1, a mirror 25 used for checking a wavelength of light emitted from the light source unit 31 of the ellipsometer 3 is provided on the stage 2, being so tilted as to reflect the light emitted from the light source unit 31, having a predetermined incident angle, vertically upwards.

The spectroscopic unit 4 has a light source 41 for emitting a white light as an illumination light, a spectrometer 42 for dispersing the reflected light reflected on the substrate 9, a light shielding pattern imaging part 43 for acquiring an image of a light shielding pattern discussed later, a substrate imaging part 44 for performing an imaging of an irradiation position of illumination light on the substrate 9, and an optical system 45. The optical system 45 directs the illumination light emitted from the light source 41 to the irradiation region on the substrate 9 and also directs the reflected light reflected on the irradiation region to the spectrometer 42, the light shielding pattern imaging part 43, and the substrate imaging part 44.

Specifically, the illumination light emitted from the light source 41 is introduced to one end of an optical fiber 451 and led out from a lens 452 provided at the other end thereof. The outgoing illumination light is directed to an aperture stop part 453 through a lens 450a. A predetermined light shielding pattern 453a (e.g., a cross-shaped calibration mark) is provided at the aperture stop part 453. The illumination light is directed to a field stop part 454 through a lens 450b with part thereof corresponding to the light shielding pattern 453a being cut off.

The illumination light whose field is limited by the field stop part 454 is directed to a half mirror 455 through a lens 450c, going through the half mirror 455, and is further directed to a half mirror 456. The illumination light reflected by the half mirror 456 is applied to the irradiation region on the substrate 9 through an objective lens 457. At this time, the extent of the irradiation region of the illumination light on the substrate 9 corresponds to the limitation of field by the field stop part 454, but an image of the light shielding pattern 453a of the aperture stop part 453 is not formed on the substrate 9. In the stress measuring apparatus 1, since the objective lens 457 with a low magnification (10× magnification in the preferred embodiment) is used and a depth of focus of the objective lens 457 is relatively large (about 4 μm), the light directed through the objective lens 457 to the substrate 9 becomes approximately parallel rays of light on the substrate 9.

The reflected light reflected on the substrate 9 is directed to the half mirror 456 through the objective lens 457, and part of the light is reflected towards the half mirror 455. The reflected light reflected on the half mirror 456 is further reflected by the half mirror 455 and received by the light shielding pattern imaging part 43 through a lens 450d. In an optical system from the light shielding pattern 453a, through the surface of the substrate 9, to the light shielding pattern imaging part 43, the position of the light shielding pattern imaging part 43 is optically conjugate to the light shielding pattern 453a, an image of the light shielding pattern 453a is formed on the light shielding pattern imaging part 43 and image data of the light shielding pattern 453a is outputted to the gradient vector calculation part 511 (see FIG. 3) of the control part 5.

The reflected light through the half mirror 456, further going through a half mirror 458, is directed to a half mirror 459 and part of the light is reflected. The reflected light reflected on the half mirror 459 passes through a lens 450e and is directed to the substrate imaging part 44 and received thereby. Since the position of the substrate imaging part 44 is optically conjugate to the positions of the field stop part 454 and the surface of the substrate 9, the substrate imaging part 44 performs an imaging of the irradiation position of the illumination light on the substrate 9 and the acquired image data is outputted to the control part 5.

The light passing through the half mirror 459 is directed to the spectrometer 42 through a lens 450f. In the spectroscopic unit 4, the reflected light reflected on the irradiation region on the substrate 9 is received to obtain spectral intensity of the reflected light by the spectrometer 42 which is a light receiving part, and data of the spectral intensity is outputted to the second film thickness calculation part 516 (see FIG. 3) of the control part 5. In the spectroscopic unit 4, the optical system 45 is constituted of the lenses 450a to 450f and 452, the optical fiber 451, the aperture stop part 453, the field stop part 454, the half mirrors 455, 456, 458 and 459, and the objective lens 457.

Next discussion will be made on a flow of measurement of a stress in the film formed on the substrate 9 in the stress measuring apparatus 1. In the stress measuring apparatus 1, a radius of curvature of a stress measurement area on the substrate 9 is obtained by the spectroscopic unit 4 and a film thickness of the stress measurement area is obtained by the ellipsometer 3 or the spectroscopic unit 4, and a stress in the stress measurement area is obtained on the basis of the radius of curvature, the film thickness, and a thickness of the substrate 9.

In the stress measuring apparatus 1, the ellipsometer 3 and the first film thickness calculation part 515 of the control part 5 serve as a film thickness measuring part for optically measuring a thickness of the film on the substrate 9, and the spectroscopic unit 4 and the second film thickness calculation part 516 serve as another film thickness measuring part for optically measuring the thickness of the film on the substrate 9. When the film on the substrate 9 is relatively thin, the first film thickness calculation part 515 performs a film thickness measurement by ellipsometry on the basis of the output indicating the polarization state from the ellipsometer 3, and when the film is relatively thick or multilayer one, the second film thickness calculation part 516 calculates a film thickness by spectroscopic reflectometry while obtaining a spectral reflectance on the basis of the output indicating the spectral intensity from the spectroscopic unit 4.

Figure 4:
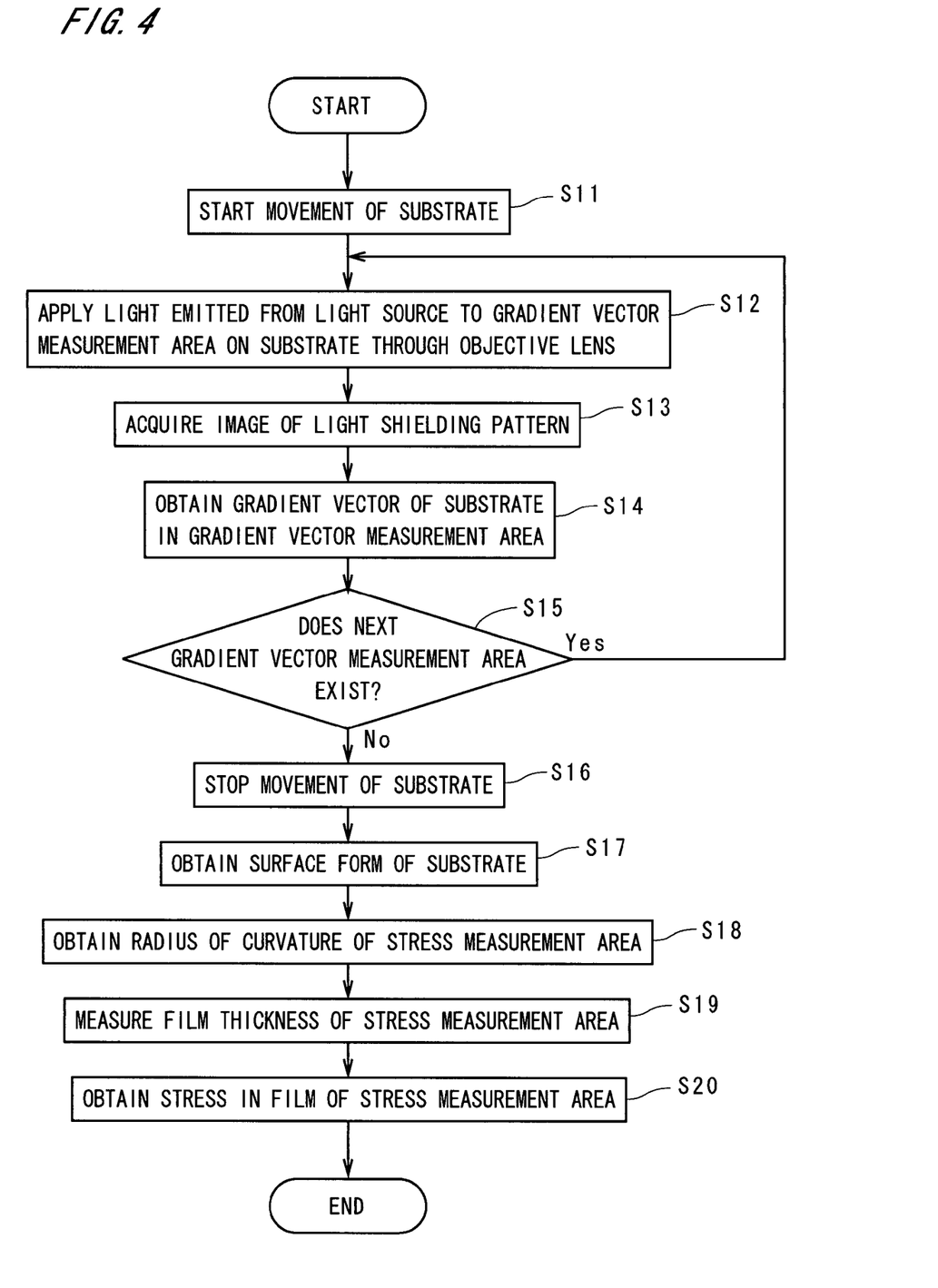
FIG. 4 is a flowchart showing an operation flow of stress measurement.

FIG. 4 is a flowchart showing an operation flow of stress measurement in the stress measuring apparatus 1. When a stress in the film formed on the substrate 9 is measured by the stress measuring apparatus 1 shown in FIG. 1, first, the substrate 9 is placed on the stage 2 and focusing is performed so that a reference area defined on the surface of the substrate 9 (i.e., the reference area is used as a reference in measurement of surface form of the substrate 9) is located within the depth of focus of the objective lens 457. In the preferred embodiment, focusing is performed by manually operating the stage elevating mechanism 24 while checking an image of the reference area on the substrate 9 through the optical system 45 by visual check. When focusing is finished, movement of the stage 2 and the substrate 9 is started by the stage moving mechanism 21 (Step S11).

Subsequently, the light emitted from the light source 41 of the spectroscopic unit 4 is applied to the irradiation region (described as "gradient vector measurement area" in FIG. 4) on the substrate 9 through the optical system 45 having the objective lens 457 (Step S12), the reflected light reflected on the irradiation region is directed to the light shielding pattern imaging part 43 through the objective lens 457, an image of the light shielding pattern 453a is acquired by the light shielding pattern imaging part 43 (Step S13). Acquired image data of the light shielding pattern 453a is outputted to the gradient vector calculation part 511 (see FIG. 3) of the control part 5.

As discussed earlier, the position of the light shielding pattern imaging part 43 is optically conjugate to the light shielding pattern 453a through the surface of the substrate 9 (the light shielding pattern imaging part 43 is positioned almost at an objective pupil position since the light shielding pattern 453a is positioned almost at an aperture stop position), and the position of the light shielding pattern in the image which is picked up by the light shielding pattern imaging part 43 is a position corresponding to a normal direction (hereinafter, referred to as "gradient vector") of the irradiation region of the illumination light on the substrate 9.

The gradient vector calculation part 511 previously stores the barycentric position (hereinafter, referred to as "reference position") of the light shielding pattern in the image when the gradient vector is the vertical direction (i.e., the Z direction), and a gradient vector of the irradiation region on the substrate 9 is obtained by calculating a vector from the reference position to the barycentric position of the light shielding pattern in the acquired image.

Specifically, when a distance between the objective lens 457 and the surface of the substrate 9 is f and an angle (hereinafter, referred to as "tilt angle") formed between the vertical direction and the gradient vector is θ, and assuming that the reflected light reflected on the substrate 9 is received at the position of the objective lens 457 to acquire the image of the light shielding pattern 453a, the position of the light shielding pattern in the acquired image is moved by (f×tan(2θ)) in a direction corresponding to tilt from a position of the light shielding pattern where the tilt angle of the substrate 9 is 0 degree. Therefore, in the image acquired by the light shielding pattern imaging part 43, the image of the light shielding pattern 453a is moved in the direction corresponding to the tilt by a distance obtained by multiplying (f×tan(2θ)) by magnification of the objective lens 457, and the distance and the direction are a distance and a direction between the above-discussed reference position and the detected barycentric position. In the gradient vector calculation part 511, the gradient vector of the substrate 9 is precisely obtained by the vector from the reference position to the barycentric position, the vector being obtained on the basis of the output of the light shielding pattern imaging part 43, and the distance f between the objective lens 457 and the surface of the substrate 9 (Step S14).

A plurality of areas in each of which the gradient vector is obtained are defined on the substrate 9 (each area is hereinafter referred to as "gradient vector measurement area"). The irradiation region of the light emitted from the light source 41 moves relatively to the substrate 9 by the stage moving mechanism 21 and goes to the next gradient vector measurement area if the next gradient vector measurement area exists (Step S15). In the stress measuring apparatus 1, relative movement of the irradiation region to the substrate 9 is continuously performed and emission of light, acquisition of the image of the light shielding pattern 453a and calculation of gradient vector of the substrate 9 (Steps S12 to S15) are sequentially performed to a plurality of gradient vector measurement areas on the substrate 9.

When calculation of gradient vectors in all the gradient vector measurement areas is finished and it is determined that the next gradient vector measurement area does not exist, movement of the substrate 9 by the stage moving mechanism 21 is stopped (Step S16). Subsequently, the surface form calculation part 512 of the control part 5 obtains surface form of the substrate 9 on the basis of the gradient vectors of the substrate 9 in the plurality of gradient vector measurement areas on the substrate 9, the gradient vectors being obtained by the gradient vector calculation part 511 (Step S17).

Specifically, when a height (i.e., coordinate value in the Z direction of FIG. 1) of a reference area which is one area out of the plurality of gradient vector measurement areas is Za, a distance in the horizontal direction (i.e., a distance in the X direction) between the reference area and one gradient vector measurement area (hereinafter, referred to as "adjacent area") which is adjacent to the reference area in the X direction is L, and angles formed between the Z direction and projections of the gradient vectors of the substrate 9 in each of the reference area and the adjacent area, onto the ZX plane, are $\theta_a$ and $\theta_b$, respectively, a height Zb of the adjacent area is obtained by Eq. 1.

$$Zb=Za+(\tan\theta_a+\tan\theta_b)L/2 \qquad \text{Eq. 1}$$

In the surface form calculation part 512, a height of each gradient vector measurement area is calculated on the basis of the gradient vector of the substrate 9 in the gradient vector measurement area and a height and a gradient vector of an adjacent gradient vector measurement area, in the order of being closer to the reference area out of the plurality of gradient vector measurement areas. A height of a gradient vector measurement area may be an average value of heights obtained by a plurality of different paths. For example, an average value of heights obtained on the basis of gradient vectors of a plurality of gradient vector measurement areas which are defined on a straight line which extends through a gradient vector measurement area toward the X direction and heights obtained on the basis of gradient vectors of a plurality of gradient vector measurement areas which are defined on a straight line which extends through the gradient vector measurement area toward the Y direction, may be used as the gradient vector of the gradient vector measurement area.

In the stress measuring apparatus 1, the same surface form measurement steps as above (Steps S11 to S17) are performed on a reference substrate with a flat surface in advance (a substrate on which a film is not formed is used as the reference substrate in the present preferred embodiment) and a height of an area corresponding to each gradient vector measurement area of the substrate 9 is obtained and stored in the surface form calculation part 512.

After heights of a plurality of gradient vector measurement areas of the reference substrate which are stored in advance are subtracted from the heights of the plurality of gradient vector measurement areas of the substrate 9 in the surface form calculation part 512, heights of areas among the plurality of gradient vector measurement areas of the substrate 9 are interpolated by spline interpolation, Bezier curve or the like, to obtain surface form of the substrate 9. In this manner, systematic errors of the stress measuring apparatus 1 are modified by modifying the heights of the gradient vector measurement areas of the substrate 9 with using the measurement results of the reference substrate, to thereby obtain the surface form of the substrate 9 with high accuracy.

Figure 5A:
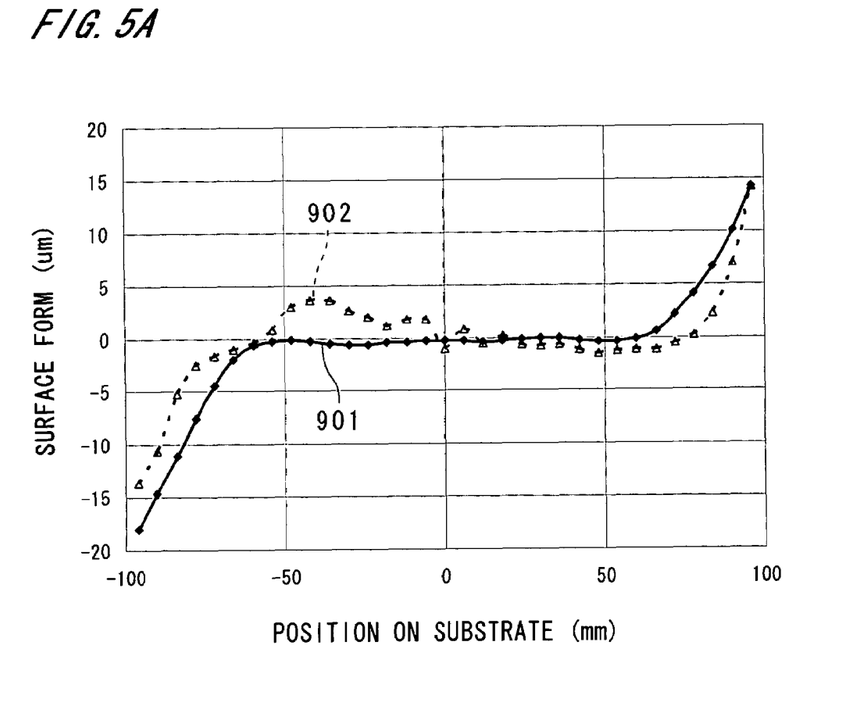
FIGS. 5A and 5B are graphs each showing surface form of a substrate.

FIG. 5A is a graph showing surface form of the substrate 9. In FIG. 5A, shown are heights of a plurality of gradient vector measurement areas which are defined on a diameter of the disk-shaped substrate 9 and surface form obtained from the heights of the plurality of gradient vector measurement areas. As shown in FIG. 5A, a portion on one side of the diameter direction of the substrate 9 to be measured (i.e., a portion on the left side of FIG. 5A) curves downwards and a portion on the other side of the diameter direction of the substrate 9 curves upwards.

In FIG. 5A, a solid line 901 shows the surface form of the substrate 9 obtained in the stress measuring apparatus 1. A broken line 902 shows measurement results of surface form of the substrate 9 in another measuring apparatus of a comparative example in FIG. 5A. In the measuring apparatus of the comparative example, a substrate is placed on a stage having an autofocus mechanism, focusing is performed to a plurality of positions on the substrate by moving the stage up and down, and then surface form of the substrate is obtained on the basis of the height of the stage after focusing in the plurality of positions.

In the measurement results of the measuring apparatus of the comparative example, relatively large projections and depressions also appear in portions close to the central portion of the substrate 9 whose surface is actually flat, due to backlash of the autofocus mechanism, as shown in FIG. 5A. In the stress measuring apparatus 1, however, the surface form corresponding to the actual form of the substrate 9 is measured with high accuracy.

Figure 5B:
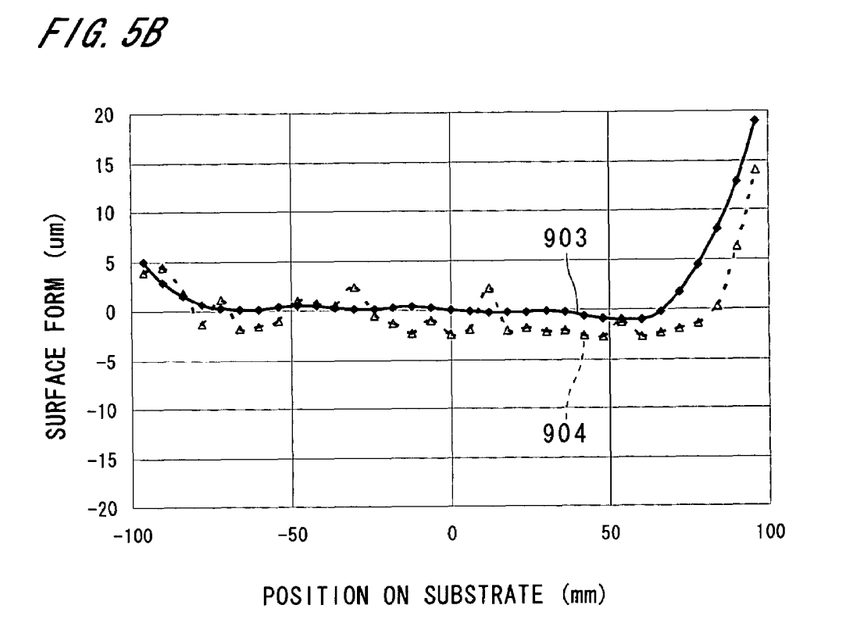

FIG. 5B is a graph showing measurement results of surface form of another substrate in the stress measuring apparatus 1 and the measuring apparatus of the comparative example. A pattern such as a wiring pattern is formed on a surface of the substrate and a film is formed on the pattern. As shown in FIG. 5B, portions on the both sides of the diameter direction of the substrate curve upwards.

In FIG. 5B, a solid line 903 shows measurement results of the stress measuring apparatus 1 and a broken line 904 shows measurement results of the measuring apparatus of the comparative example. In the stress measuring apparatus 1, it is also possible to measure surface form of the substrate on which the pattern is formed with high accuracy, in comparison with the measuring apparatus of the comparative example, as shown in FIG. 5B.

After the surface form of the substrate 9 is measured, a radius of curvature of a stress measurement area which is defined on the substrate 9 is obtained on the basis of surface form in the vicinity of the stress measurement area (e.g., on the basis of a height of the stress measurement area and heights of four points around the stress measurement area) by the curvature radius calculation part 513 (see FIG. 3) of the control part 5 (Step S18). In a case where it is previously known that a curvature of a ZX cross section (i.e., a cross section cut by the ZX plane) of a portion which is close to the stress measurement area is approximately equal to a curvature of a ZY cross section (i.e., a cross section cut by the ZY plane) of the portion, the radius of curvature of the stress measurement area may be obtained, for example, on the basis of the height of the stress measurement area and heights of two points on the both sides of the X direction of the stress measurement area. The stress measurement area may coincide with one of the plurality of gradient vector measurement areas on the substrate 9 and may be defined among the plurality of gradient vector measurement areas. Also, the plurality of gradient vector measurement areas may be defined on the substrate 9.

After the radius of curvature of the stress measurement area is obtained, a film thickness on the substrate 9 in the stress measurement area is optically measured by the ellipsometer 3 and the first film thickness calculation part 515 or the spectroscopic unit 4 and the second film thickness calculation part 516 (i.e., by the film thickness measuring part in the stress measuring apparatus 1) (Step S19). In the following description, film thickness measurement by the ellipsometer 3 is described first and then described is film thickness measurement by the spectroscopic unit 4.

In measurement of film thickness by the ellipsometer 3, first, the mirror 25 on the stage 2 moves to the irradiation position of the laser beam emitted from the light source unit 31 by the stage moving mechanism 21, the laser beam from the light source unit 31 is reflected by the mirror 25 and directed to the spectrometer 42 of the spectroscopic unit 4. In the spectrometer 42, spectral intensity of the received light is acquired and as a result, confirmation of the wavelength of the laser beam emitted from the laser diode 312 (hereinafter, referred to as "laser wavelength calibration") is substantially performed. The acquired wavelength of the laser beam is outputted to the first film thickness calculation part 515 (see FIG. 3) of the control part 5 and is used for the film thickness measurement by the ellipsometer 3.

Subsequently, the illumination light is emitted from the light source 41 of the spectroscopic unit 4 and an image of the substrate 9 is acquired by the substrate imaging part 44. The stage moving mechanism 21 moves the substrate 9 and the stage 2 on the basis of the image and the irradiation position of the polarized light emitted from the light source unit 31 of the ellipsometer 3 is thereby adjusted to the stress measurement area on the substrate 9. After adjustment of the position, the polarized light from the light source unit 31 is emitted to the substrate 9 and the polarization state of the reflected light reflected on the substrate 9 is acquired by the light receiving unit 32.

In the first film thickness calculation part 515 (see FIG. 3) of the control part 5, a gradient vector of the stress measurement area is calculated from the surface form of the substrate 9 which is obtained by the surface form calculation part 512, to obtain an accurate incident angle of the polarized light to the stress measurement area. Then, a film thickness in the stress measurement area on the substrate 9 is obtained on the basis of the polarization state acquired by the light receiving unit 32 (accurately, the polarization state of the light emitted from the light source unit 31 is utilized), while using the incident angle of the polarized light and the wavelength of the polarized light from the light source unit 31, the wavelength being acquired by the laser wavelength calibration. In a case where the stress measurement area coincides with any area of the plurality of gradient vector measurement areas, the polarization state of the reflected light reflected on the substrate 9 may be acquired during measurement of the gradient vector.

In the stress measuring apparatus 1, since the laser wavelength calibration of the ellipsometer 3 is performed before the film thickness measurement, it is possible to accurately obtain the film thickness even if the wavelength of the light emitted from the light source unit 31 is changed due to changes in ambient temperature, characteristics of the constituent elements of the light source unit 31, or the like. Also, it is possible to accurately obtain the film thickness in the stress measurement area by modifying the tilt of the substrate 9 with use of the surface form of the substrate 9 which is obtained by the surface form calculation part 512.

Next discussion will be made on film thickness measurement by the spectroscopic unit 4. In measurement of film thickness by the spectroscopic unit 4, first, the illumination light emitted from the light source 41 is directed to the stress measurement area of the substrate 9 through the optical system 45 in the spectroscopic unit 4 and the reflected light reflected on the substrate 9 is directed to the spectrometer 42. Spectral intensity of the reflected light is acquired by the spectrometer 42 and spectral intensity data of the substrate 9 is outputted to the second film thickness calculation part 516 of the control part 5.

In the stress measuring apparatus 1, spectral intensity of a reference substrate (a silicon substrate in the preferred embodiment) is previously acquired by the spectroscopic unit 4 and stored in the second film thickness calculation part 516. A film thickness of a natural oxide film of silicon dioxide ($SiO_2$) formed on the reference substrate is previously measured by the ellipsometer 3 and the first film thickness calculation part 515, and stored in the second film thickness calculation part 516. In the second film thickness calculation part 516, a (vertical) spectral reflectance of the reference substrate is calculated from the film thickness of the natural oxide film measured by the ellipsometer 3 by theoretical computation and is stored as a "theoretical spectral reflectance" in advance.

A spectral reflectance of the substrate 9 is obtained from the spectral intensities of the reference substrate and the substrate 9 on the basis of the theoretical spectral reflectance of the reference substrate in the second film thickness calculation part 516. Herein, when the theoretical spectral reflectance of the reference substrate is $Rc(\lambda)$, the spectral intensity of the reference substrate is $Ic(\lambda)$, the spectral intensity of the substrate 9 is $Im(\lambda)$ and the spectral reflectance of the substrate 9 is $Rm(\lambda)$, the spectral reflectance $Rm(\lambda)$ of the substrate 9 is obtained by Eq. 2.

$$Rm(\lambda)=(Im(\lambda)/Ic(\lambda)) \times Rc(\lambda) \qquad \text{Eq. 2}$$

In other words, the spectral reflectance of the substrate 9 is obtained by multiplying the spectral intensity of the substrate 9 which is obtained by the spectroscopic unit 4 by the ratio between the theoretical spectral reflectance of the reference substrate and the spectral intensity of the reference substrate. In the second film thickness calculation part 516, a film thickness of the stress measurement area on the substrate 9 is further obtained from the spectral reflectance of the substrate 9 with accuracy. In a case where the stress measurement area coincides with any area of the plurality of gradient vector measurement areas, the spectral intensity of the reflected light reflected on the substrate 9 may be acquired during measurement of the gradient vector.

When the film thickness measurement is finished as discussed above, the stress calculation part 514 of the control part 5 calculates a stress in the film of the stress measurement area on the basis of the radius of curvature and the film thickness of the stress measurement area which are obtained by the curvature radius calculation part 513 and the film thickness measuring part (i.e., the ellipsometer 3 and the first film thickness calculation part 515 or the spectroscopic unit 4 and the second film thickness calculation part 516) in Steps S18 and S19 and a thickness of the substrate 9 which is previously inputted through the input part 56 (see FIG. 2) of the control part 5 (Step S20). When the radius of curvature and the film thickness of the stress measurement area are respectively R and $h_f$, the thickness of the substrate 9 is h, and a Young's modulus and a Poisson's ratio of the substrate 9 are respectively E and ν, a stress σ in the film of the stress measurement area is obtained by Eq. 3.

$$\sigma = (E/(1-\nu)) \times (h^2/(6Rh_f)) \qquad \text{Eq. 3}$$

As discussed above, the gradient vectors of the substrate 9 in the plurality of gradient vector measurement areas on the substrate 9 are obtained in the stress measuring apparatus 1 by acquiring the image of the light shielding pattern 453a positioned at the aperture stop part 453 by the light shielding pattern imaging part 43, and the surface form of the substrate 9 is obtained on the basis of the plurality of gradient vectors. The stress in the film of the stress measurement area is calculated on the basis of the radius of curvature of the stress measurement area which is obtained based on the surface form, the film thickness of the stress measurement area which is obtained with use of the ellipsometer 3 or the spectroscopic unit 4, and the thickness of the substrate 9.

When the gradient vector of the gradient vector measurement area on the substrate 9 is obtained in the stress measuring apparatus 1, the light is applied to the substrate 9 through the objective lens 457 with a relatively low magnification and the image of the light shielding pattern 453a is acquired by receiving the reflected light reflected on the substrate 9 by the light shielding pattern imaging part 43. As described above, since the depth of focus of the objective lens 457 is relatively large, even if the gradient vector measurement area on the substrate 9 is slightly shifted from the reference area (i.e., the area where focusing is performed) with respect to the vertical direction (i.e., the Z direction in FIG. 1), it is possible to acquire the image of the light shielding pattern 453a with high accuracy without affecting the imaging relationship between the light shielding pattern 453a and the light shielding pattern imaging part 43, only if the gradient vector measurement area on the substrate 9 is located within the range of the depth of focus of the objective lens 457.

Since the light which is directed through the objective lens 457 to the substrate 9 becomes approximately parallel rays of light on the substrate 9, even if the gradient vector measurement area is slightly shifted from the range of the depth of focus, it is possible to acquire the image of the light shielding pattern 453a with accuracy. As a result, when the gradient vector is measured in each of the plurality of gradient vector measurement areas on the substrate 9, measurement can be performed rapidly with high accuracy without focusing on each gradient vector measurement area, and it is therefore possible to obtain the surface form of the substrate 9 rapidly with high accuracy.

The image of the light shielding pattern 453a is formed by the white light emitted from the light source 41 of the spectroscopic unit 4 of the stress measuring apparatus 1. Therefore, even if the substrate 9 or the film on the substrate 9 is formed of material which absorbs light in a specific wavelength band, the image of the light shielding pattern 453a can be formed on the light shielding pattern imaging part 43 with using light in a wavelength band other than that absorbed by the substrate 9 or the like. Consequently, regardless of material of the substrate 9 or the film, it is possible to obtain gradient vectors and surface forms of various kinds of substrates on which various kinds of films are formed, easily with high accuracy.

Though the light shielding pattern 453a and the light shielding pattern imaging part 43 are optically conjugate in the spectroscopic unit 4, since the light shielding pattern 453a and the substrate 9 are not conjugate, the image of the light shielding pattern 453a is not formed on the substrate 9. Even if a pattern is formed on the substrate 9, the image of the light shielding pattern 453a acquired by the light shielding pattern imaging part 43 is not influenced by the pattern on the substrate 9. Thus, it is possible to obtain gradient vectors and surface forms of various kinds of substrates easily with high accuracy, regardless of the presence or absence of a pattern on the substrate 9.

As discussed above, since the surface form of the substrate 9 can be obtained easily and rapidly with accuracy in the stress measuring apparatus 1, it is possible to calculate the stress in the film of the stress measurement area on the basis of the radius of curvature of the stress measurement area obtained based on the surface form, the film thickness of the stress measurement area, and the thickness of the substrate 9.

In measurement of the gradient vector in the stress measuring apparatus 1, the tilts of the substrate 9 in the plurality of gradient vector measurement areas can be acquired more rapidly by continuously moving the irradiation region of the illumination light emitted from the spectroscopic unit 4 relatively to the substrate 9. As a result, it is possible to more rapidly obtain the surface form of the substrate 9 and the stress in the film of the stress measurement area.

In the film thickness measurement of the stress measuring apparatus 1, a film thickness of a relatively thin film can be measured with high accuracy by using the ellipsometer 3. Since the spectroscopic unit 4 is used in the film thickness measurement, a film thickness of a relatively thick film or a multilayer film can be measured with high accuracy. In the spectroscopic unit 4, since measurement of film thickness is performed by using the optical system 45 which is used in measurement of surface form of the substrate 9, it is possible to simplify the construction of the stress measuring apparatus 1.

Also, the stress measuring apparatus 1 can be used as a surface form measuring apparatus for measuring surface form of the substrate 9 without performing stress measurement, with use of the stage 2 for holding the substrate 9, the stage moving mechanism 21, the light source 41, the optical system 45, the light shielding pattern 453a and the light shielding pattern imaging part 43 in the spectroscopic unit 4, and the gradient vector calculation part 511 and the surface form calculation part 512 of the control part 5.

As discussed above, in the stress measuring apparatus 1, the image of the light shielding pattern 453a is acquired without repeating focusing on the plurality of gradient vector measurement areas, to thereby obtain the gradient vectors of the substrate 9 in the plurality of gradient vector measurement areas rapidly with high accuracy. Further, gradient vectors of various kinds of substrates can be obtained easily and rapidly with high accuracy, regardless of material of the substrate 9 or the film and the presence or absence of a pattern on the substrate 9. Therefore, also in a case where the stress measuring apparatus 1 is used as the surface form measuring apparatus, it is possible to obtain surface form of the substrate 9 on the basis of the gradient vectors of the substrate 9 easily and rapidly with high accuracy.

As described above, in measurement of the gradient vectors in the stress measuring apparatus 1, the tilts of the substrate 9 in the plurality of gradient vector measurement areas can be acquired more rapidly by continuously moving the irradiation region of the illumination light emitted from the spectroscopic unit 4 relatively to the substrate 9. As a result, it is possible to more rapidly obtain the surface form of the substrate 9.

Figure 6:
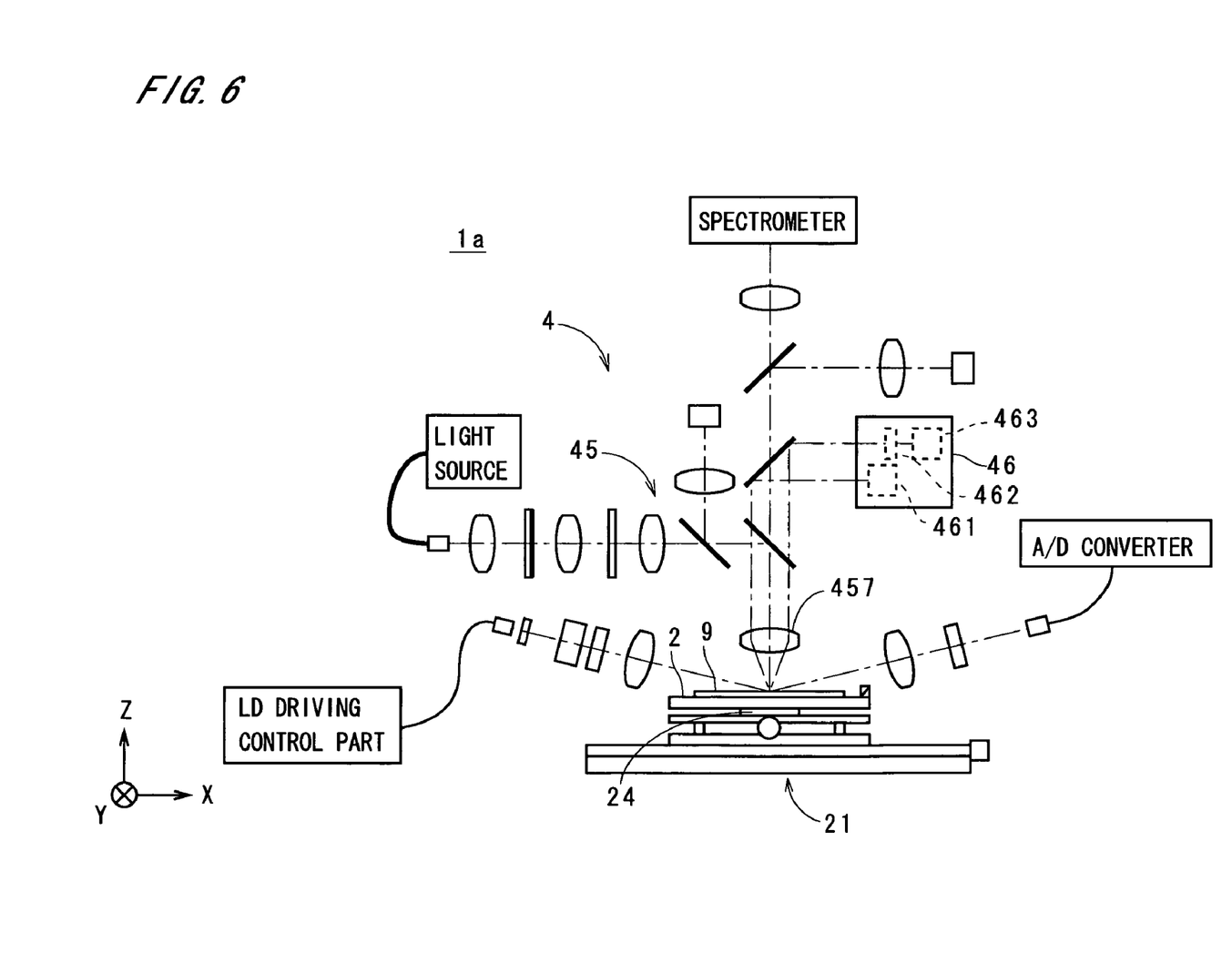
FIG. 6 is a view showing a constitution of a stress measuring apparatus in accordance with a second preferred embodiment.

Next discussion will be made on a stress measuring apparatus in accordance with the second preferred embodiment of the present invention. FIG. 6 is a view showing a construction of a stress measuring apparatus 1a in accordance with the second preferred embodiment. As shown in FIG. 6, the stress measuring apparatus 1a has an autofocus detection unit (hereinafter, referred to as "AF detection unit") 46 which is a distance detection part for detecting a distance in the vertical direction (i.e., the Z direction in FIG. 6) between the objective lens 457 of the spectroscopic unit 4 and the stage 2 where a substrate 9 is not held or a distance in the vertical direction between the objective lens 457 and a surface of the substrate 9 held on the stage, in addition to the constituent elements of the stress measuring apparatus 1 shown in FIG. 1. The other constituent elements are almost the same as those in the stress measuring apparatus 1 of FIG. 1 and the same reference signs are used in the following discussion. A flow of measurement of a stress in a film formed on the substrate 9 in the stress measuring apparatus 1a is almost the same as in the first preferred embodiment. In FIG. 6, the control part 5 is omitted for simplification of illustration.

As shown in FIG. 6, the AF detection unit 46 has a laser diode 461 for emitting a laser beam, a cylindrical lens 462, and an AF detection part 463 for detecting a position of received light by a PSD (Position Sensitive Detector) element. In a state where the substrate 9 is placed on the stage 2, the laser beam emitted from the laser diode 461 is applied to the surface of the substrate 9 through the objective lens 457 of the optical system 45. A reflected light of the laser beam reflected on the substrate 9 is directed to the cylindrical lens 462 of the AF detection unit 46 through the objective lens 457 and further directed to the AF detection part 463. In the AF detection part 463, the distance between the objective lens 457 and the surface of the substrate 9 is detected on the basis of a receiving position of the reflected light reflected on the substrate 9. In a state where the substrate 9 is not placed on the stage 2, the distance between the objective lens 457 and a surface of the stage 2 is detected.

Figure 7:
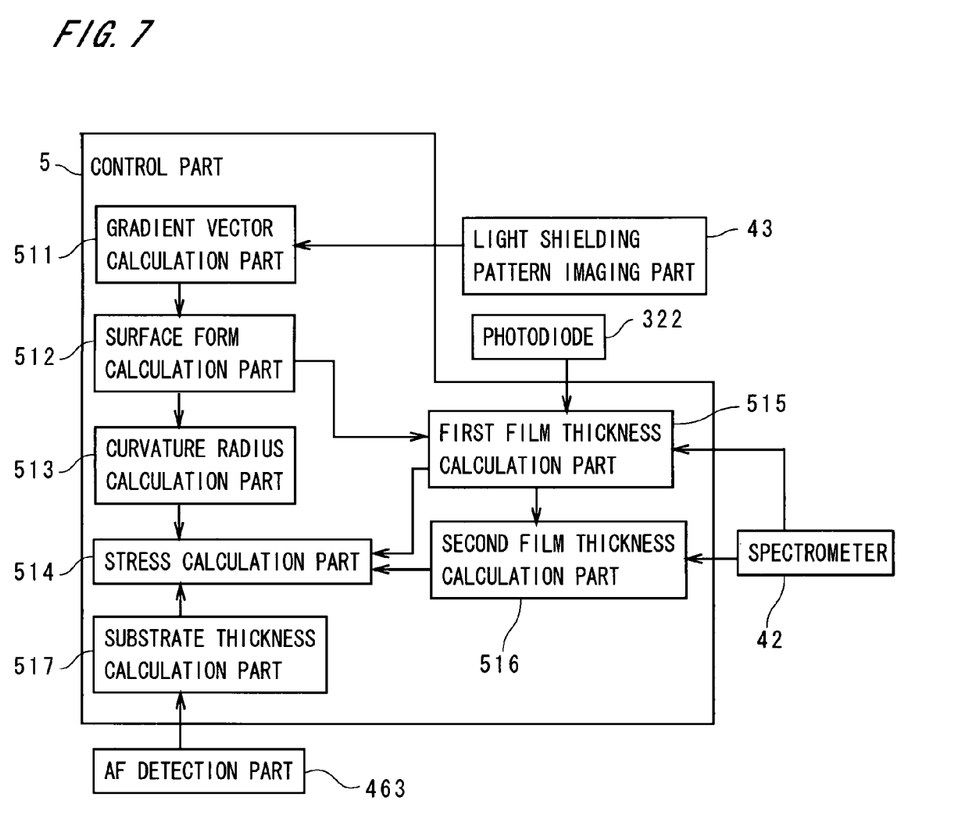
FIG. 7 is a block diagram showing functions of a control part.

FIG. 7 is a block diagram showing functions of the control part 5 in the stress measuring apparatus 1a, together with other functional constitutions. The control part 5 in the stress measuring apparatus 1a further has a substrate thickness calculation part (i.e., an object thickness calculation part) 517 for obtaining a thickness of the substrate 9. The other constituent elements are the same as those in FIG. 3.

In the stress measuring apparatus 1a, the distance between the objective lens 457 and the substrate 9 and the distance between the objective lens 457 and the stage 2 in a state where the substrate 9 is not hold are detected in the AF detection part 463 of the AF detection unit 46, and the two distances are outputted to the substrate thickness calculation part 517 of the control part 5. A thickness of the substrate 9 is obtained on the basis of the two distances in the substrate thickness calculation part 517. In the preferred embodiment, the difference between the two distances is obtained as the thickness of the substrate 9.

The thickness of the substrate 9 obtained by the substrate thickness calculation part 517 is used in calculation of a stress in a film on the substrate 9, the calculation being performed by the stress calculation part 514 shown in Step S20 of FIG. 4 in stress measurement in the stress measuring apparatus 1a. In this case, input of the thickness of the substrate 9 from the input part 56 of the control part 5 is omitted.

Similarly to the first preferred embodiment, a stress in a film of a stress measurement area on the substrate 9 can be obtained easily and rapidly with accuracy in the stress measuring apparatus 1a in accordance with the second preferred embodiment. Since the thickness of the substrate 9 can be obtained by the AF detection unit 46 with high accuracy in the stress measuring apparatus 1a, it is possible to more accurately acquire a stress in the film of the stress measurement area.

In the stress measuring apparatus 1a, the AF detection unit 46 is also used in focusing which is performed before start of movement of the substrate 9 (FIG. 4: Step S11). In focusing to the substrate 9, the substrate 9 is moved in the vertical direction by the stage elevating mechanism 24 together with the stage 2 on the basis of the distance between the objective lens 457 and the surface of the substrate 9, which is detected by the AF detection unit 46, and the surface of the substrate 9 is located within the range of the depth of focus of the objective lens 457.

There may be a case where movement of the substrate 9 by the stage moving mechanism 21 is stopped in measurement of a gradient vector in each gradient vector measurement area on the substrate 9 in the stress measuring apparatus 1a, and focusing by the AF detection unit 46 and the stage elevating mechanism 24 is performed. Also in this case, since the depth of focus of the objective lens 457 is relatively large and the light which is directed through the objective lens 457 to the substrate 9 becomes approximately parallel rays of light, it is possible to suppress the accuracy required for focusing relatively low and reduce a time period for focusing in comparison with a measuring apparatus for obtaining a radius of curvature of a substrate by the optical lever detection method which needs high accurate focusing or the like. As a result, it is possible to reduce a time period for measurement of the surface form of the substrate 9 and that for stress measurement in the film formed on the substrate 9.

Though the preferred embodiments of the present invention have been discussed above, the present invention is not limited to the above-discussed preferred embodiments, but allows various variations.

For example, in a state where the stage 2 is fixed, the irradiation region on the substrate 9 of the lights, which are emitted from the light source 41 of the spectroscopic unit 4 and the light source unit 31 of the ellipsometer 3, may be moved relatively to the substrate 9 in the stress measuring apparatuses in accordance with the above preferred embodiments.

The light shielding pattern 453a is not necessarily positioned at the position of the aperture stop part 453 but has only to be positioned at a position almost optically conjugate to the aperture stop position on the optical path from the light source 41 of the spectroscopic unit 4 to the substrate 9. The light shielding pattern 453a may be a pattern for cutting off only light of specific wavelength, and in this case, a filter for transmitting only the light of the specific wavelength may be provided in the light shielding pattern imaging part 43.

The polarized light emitted from the light source unit 31 of the ellipsometer 3 to the substrate 9 is not limited to a circularly polarized light but various polarized lights (e.g., a linearly polarized light) as appropriate may be used as necessary. The light emitted from the light source unit 31 is not limited to the laser beam where the laser diode is used as the light source, but, for example, a white light is emitted from the light source unit 31 and a reflected light of the white light may be received by a spectrometer which is provided instead of the photodiode 322 in the light receiving unit 32.

In the stress measuring apparatus 1a in accordance with the second preferred embodiment, the light which is used for detection of the distance between the objective lens 457 and the substrate 9 or the stage 2 in the AF detection unit 46 is not necessarily emitted from the AF detection unit 46. For example, there may be a case where the light emitted from the light source 41 of the spectroscopic unit 4 is reflected by the substrate 9 or the stage 2 and directed to the AF detection part 463 through the objective lens 457 to acquire an object image, and automatic focusing is performed on the basis of sharpness of the image. In this manner, the distance between the objective lens 457 and the substrate 9 or the stage 2 is detected in the AF detection unit 46 with use of the light directed through the objective lens 457, thereby achieving simplification of the construction of the stress measuring apparatus 1a.

The substrate 9 is not limited to a semiconductor substrate but may be a glass substrate used for liquid crystal displays, other flat panel displays, or the like. The stress measuring apparatuses in the above preferred embodiments can be applied to measurement of surface forms of various objects other than a substrate and measurement of stresses in films formed on the objects.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2006-306471 filed in the Japan Patent Office on Nov. 13, 2006 and Japanese Patent Application No. 2007-237381 filed in the Japan Patent Office on Sep. 13, 2007, the entire disclosures of which are incorporated herein by reference.

What is claimed is:

1. A surface form measuring apparatus for measuring surface form of an object, comprising:
   a light source for emitting a light;
   an optical system for directing said light emitted from said light source to an irradiation region on an object through an objective lens and directing a reflected light reflected on said irradiation region to a predetermined position through said objective lens;
   a light shielding pattern positioned at a position almost optically conjugate to an aperture stop position on an optical path from said light source to said irradiation region;
   an imaging part for acquiring an image of said light shielding pattern formed on said predetermined position;
   a gradient vector calculation part for obtaining a gradient vector indicating a normal direction of said irradiation region on the basis of an output of said imaging part;
   a moving mechanism for moving said irradiation region relatively to said object; and
   a surface form calculation part for obtaining surface form of said object on the basis of gradient vectors in a plurality of areas on said object, said gradient vectors being obtained by said gradient vector calculation part.

2. A stress measuring apparatus for measuring a stress in a film formed on an object, comprising:
   a light source for emitting a light;
   an optical system for directing said light emitted from said light source to an irradiation region on an object through an objective lens and directing a reflected light reflected on said irradiation region to a predetermined position through said objective lens;
   a light shielding pattern positioned at a position almost optically conjugate to an aperture stop position on an optical path from said light source to said irradiation region;
   an imaging part for acquiring an image of said light shielding pattern formed on said predetermined position;
   a gradient vector calculation part for obtaining a gradient vector indicating a normal direction of said irradiation region on the basis of an output of said imaging part;
   a moving mechanism for moving said irradiation region relatively to said object;
   a surface form calculation part for obtaining surface form of said object on the basis of gradient vectors in a plurality of areas on said object, said gradient vectors being obtained by said gradient vector calculation part;
   a curvature radius calculation part for obtaining a radius of curvature of a stress measurement area on said object on the basis of said surface form obtained by said surface form calculation part;
   a film thickness measuring part for optically measuring a thickness of a film formed on said object; and
   a stress calculation part for obtaining a stress in said film of said stress measurement area on the basis of said radius of curvature and said thickness of said film in said stress measurement area which are obtained by said curvature radius calculation part and said film thickness measuring part.

3. The stress measuring apparatus according to claim 2, wherein
   said film thickness measuring part comprises:
   a light receiving part for receiving said reflected light reflected on said irradiation region; and
   a film thickness calculation part for obtaining a thickness of said film in said irradiation region by spectroscopic reflectometry on the basis of an output of said light receiving part.

4. The stress measuring apparatus according to claim 3, further comprising:
   a holding part for holding said object;
   a distance detection part for detecting a distance between said objective lens and said holding part where an object is not held and a distance between said objective lens and said object held by said holding part with use of a light directed through said objective lens; and
   an object thickness calculation part for obtaining a thickness of said object on the basis of said distance between said objective lens and said object and said distance between said objective lens and said holding part, said thickness of said object being used in calculation of a stress in said film by said stress calculation part.

5. The stress measuring apparatus according to claim 3, wherein
   said film thickness measuring part further comprises:
   a light source unit which has another light source and emits a polarized light to said object;
   a light receiving unit which receives a reflected light of said polarized light reflected on said object to acquire a polarization state of said reflected light; and
   a film thickness calculation part for obtaining a thickness of said film formed on said object on the basis of said polarization state acquired by said light receiving unit.

6. The stress measuring apparatus according to claim 5, further comprising:
   a holding part for holding said object;
   a distance detection part for detecting a distance between said objective lens and said holding part where an object is not held and a distance between said objective lens and said object held by said holding part with use of a light directed through said objective lens; and
   an object thickness calculation part for obtaining a thickness of said object on the basis of said distance between said objective lens and said object and said distance between said objective lens and said holding part, said thickness of said object being used in calculation of a stress in said film by said stress calculation part.

7. The stress measuring apparatus according to claim 2, wherein
   said film thickness measuring part further comprises:
   a light source unit which has another light source and emits a polarized light to said object;
   a light receiving unit which receives a reflected light of said polarized light reflected on said object to acquire a polarization state of said reflected light; and
   a film thickness calculation part for obtaining a thickness of said film formed on said object on the basis of said polarization state acquired by said light receiving unit.

8. The stress measuring apparatus according to claim 7, further comprising:
   a holding part for holding said object;
   a distance detection part for detecting a distance between said objective lens and said holding part where an object is not held and a distance between said objective lens and said object held by said holding part with use of a light directed through said objective lens; and
   an object thickness calculation part for obtaining a thickness of said object on the basis of said distance between said objective lens and said object and said distance between said objective lens and said holding part, said thickness of said object being used in calculation of a stress in said film by said stress calculation part.

9. The stress measuring apparatus according to claim 2, further comprising:
    a holding part for holding said object;
    a distance detection part for detecting a distance between said objective lens and said holding part where an object is not held and a distance between said objective lens and said object held by said holding part with use of a light directed through said objective lens; and
    an object thickness calculation part for obtaining a thickness of said object on the basis of said distance between said objective lens and said object and said distance between said objective lens and said holding part, said thickness of said object being used in calculation of a stress in said film by said stress calculation part.

10. A surface form measuring method of measuring surface form of an object, comprising the steps of:
    a) applying a light emitted from a light source to an irradiation region on an object through an optical system having an objective lens;
    b) directing a reflected light of said light reflected on said irradiation region to a predetermined position through said objective lens, to form an image of a light shielding pattern on said predetermined position and acquire said image by an imaging part, said light shielding pattern being positioned at a position almost optically conjugate to an aperture stop position on an optical path from said light source to said irradiation region;
    c) repeating said steps a) and b) while moving said irradiation region relatively to said object to obtain gradient vectors indicating a normal direction of a plurality of areas on said object on the basis of outputs of said imaging part; and
    d) obtaining surface form of said object on the basis of said gradient vectors in said plurality of areas.

11. The surface form measuring method according to claim 10, wherein
    relative movement of said irradiation region to said object is continuously performed in said step c).

12. A stress measuring method of measuring a stress in a film formed on an object, comprising the steps of;
    a) applying a light emitted from a light source to an irradiation region on an object through an optical system having an objective lens;
    b) directing a reflected light of said light reflected on said irradiation region to a predetermined position through said objective lens, to form an image of a light shielding pattern on said predetermined position and acquire said image by an imaging part, said light shielding pattern being positioned at a position almost optically conjugate to an aperture stop position on an optical path from said light source to said irradiation region;
    c) repeating said steps a) and b) while moving said irradiation region relatively to said object to obtain gradient vectors indicating a normal direction of a plurality of areas on said object on the basis of outputs of said imaging part;
    d) obtaining surface form of said object on the basis of said gradient vectors in said plurality of areas;
    e) obtaining a radius of curvature of a stress measurement area on said object on the basis of said surface form;
    f) optically measuring a thickness of a film in said stress measurement area; and
    g) obtaining a stress in said film of said stress measurement area on the basis of said radius of curvature and said thickness of said film in said stress measurement area.

13. The stress measuring method according to claim 12, wherein
    relative movement of said irradiation region to said object is continuously performed in said step c).

14. The stress measuring method according to claim 12, wherein
    said step f) comprises the steps of:
    h) applying said light emitted from said light source to said stress measurement area;
    i) receiving a reflected light reflected on said stress measurement area of said light to acquire spectral intensity of said reflected light; and
    j) obtaining a thickness of said film in said stress measurement area by spectroscopic reflectometry on the basis of said spectral intensity of said reflected light acquired in said step i).

15. The stress measuring method according to claim 14, further comprising, before said step g), the steps of:
    k) detecting a distance between said objective lens and a holding part for holding said object with use of a light directed through said objective lens;
    l) detecting a distance between said objective lens and said object held by said holding part with use of a light directed through said objective lens; and
    m) obtaining a thickness of said object which is used in calculation of a stress in said film in said step g), on the basis of distances detected in said steps k) and l).

16. The stress measuring method according to claim 12, wherein
    said step f) comprises the steps of:
    n) applying a polarized light emitted from another light source to said stress measurement area;
    o) receiving a reflected light of said polarized light reflected on said stress measurement area to acquire a polarization state of said reflected light; and
    p) obtaining a thickness of said film in said stress measurement area on the basis of said polarization state of said reflected light acquired in said step o).

17. The stress measuring method according to claim 16, further comprising, before said step g), the steps of:
    k) detecting a distance between said objective lens and a holding part for holding said object with use of a light directed through said objective lens;
    l) detecting a distance between said objective lens and said object held by said holding part with use of a light directed through said objective lens; and
    m) obtaining a thickness of said object which is used in calculation of a stress in said film in said step g), on the basis of distances detected in said steps k) and l).

18. The stress measuring method according to claim 12, further comprising, before said step g), the steps of:
    k) detecting a distance between said objective lens and a holding part for holding said object with use of a light directed through said objective lens;
    l) detecting a distance between said objective lens and said object held by said holding part with use of a light directed through said objective lens; and
    m) obtaining a thickness of said object which is used in calculation of a stress in said film in said step g), on the basis of distances detected in said steps k) and l).

19. The stress measuring method according to claim 13, wherein said step f) comprises the steps of:

h) applying said light emitted from said light source to said stress measurement area;

i) receiving a reflected light reflected on said stress measurement area of said light to acquire spectral intensity of said reflected light; and j) obtaining a thickness of said film in said stress measurement area by spectroscopic reflectometry on the basis of said spectral intensity of said reflected light acquired in said step i).

20. The stress measuring method according to claim 13, wherein said step f) comprises the steps of:

n) applying a polarized light emitted from another light source to said stress measurement area;

o) receiving a reflected light of said polarized light reflected on said stress measurement area to acquire a polarization state of said reflected light; and p) obtaining a thickness of said film in said stress measurement area on the basis of said polarization state of said reflected light acquired in said step o).

* * * * *